(12) United States Patent
Chrysaidos

(10) Patent No.: US 10,846,395 B2
(45) Date of Patent: Nov. 24, 2020

(54) DETECTING SUSPICIOUS APPLICATION OVERLAYS ON A DEVICE

(71) Applicant: Avast Software s.r.o., Prague (CZ)

(72) Inventor: Nikolaos Chrysaidos, Athens (GR)

(73) Assignee: Avast Software s.r.o., Prague (CZ)

( * ) Notice: Subject to any disclaimer, the term of this patent is extended or adjusted under 35 U.S.C. 154(b) by 140 days.

(21) Appl. No.: 15/918,874

(22) Filed: Mar. 12, 2018

(65) Prior Publication Data

US 2018/0268129 A1 Sep. 20, 2018

Related U.S. Application Data

(60) Provisional application No. 62/472,435, filed on Mar. 16, 2017.

(51) Int. Cl.
*G06F 21/55* (2013.01)
*G06F 21/52* (2013.01)
*G06F 21/84* (2013.01)

(52) U.S. Cl.
CPC ............ *G06F 21/52* (2013.01); *G06F 21/554* (2013.01); *G06F 21/84* (2013.01); *G06F 2221/031* (2013.01); *G06F 2221/2151* (2013.01)

(58) Field of Classification Search
CPC ........ G06F 21/52; G06F 21/554; G06F 21/84; G06F 2221/031; G06F 2221/2151
See application file for complete search history.

(56) References Cited

U.S. PATENT DOCUMENTS

2011/0161667 A1* 6/2011 Poornachandran ..... G06F 21/84
713/168

OTHER PUBLICATIONS

Bianchi et al., What the App is That? Deception and Countermeasures in the Android User Interface, IEEE, 2015.*
Chen et al., Peeking into Your App without Actually Seeing It: UI State Inference and Novel Android Attacks, USENIX, 2014.*

* cited by examiner

*Primary Examiner* — Minh Dinh
(74) *Attorney, Agent, or Firm* — Erickson Kernell IP, LLC

(57) ABSTRACT

Systems and methods detect suspicious application overlays on a device. An overlay detection unit can detect if a first foreground application has been replaced, within a threshold amount of time, by a second foreground application. If the replacement time is below a threshold amount of time, a suspicious overlay detection can be triggered to alert the user to a possible phishing attempt by the second foreground application.

20 Claims, 5 Drawing Sheets

DETECTING SUSPICIOUS APPLICATION OVERLAYS ON A DEVICE

CROSS-REFERENCE TO RELATED APPLICATIONS

This Application claims priority to U.S. Provisional Patent Application Ser. No. 62/472,435, filed on Mar. 16, 2017, entitled "Detecting Suspicious Application Overlays on a Device," the entire disclosure of which is incorporated herein by reference.

FIELD OF INVENTION

The present invention relates generally to systems and methods for device security, and more particularly, to detecting a suspicious application overlay on a device.

BACKGROUND OF INVENTION

Over time, smartphones, tablets and other mobile devices have become more capable and their use has increased. With the increasing use of mobile devices for everyday tasks also comes the increasing risk of losing sensitive data. For example, a mobile device may be subject to a "phishing" attack. In a phishing attack, a malicious website or application may present a user interface to a user that appears to be a legitimate request for authentication or authorization credentials such as a username and password. For example, the malicious website or application may be made to appear to be a website or application the user is familiar with or trusts. The malicious website or application obtains the user's credentials, allowing the operator of the malicious website or application to utilize the user's credentials to obtain the user's sensitive information (e.g., financial data, health data, email, etc.).

Accordingly, a need exists for a system and method for detecting malicious websites or applications that cause a user interface to replace or otherwise overlay the user interface of a legitimate website or application on a device. A need also exists for a system and method adapted for alerting a user when a user interface of a potentially malicious website or application has replaced or otherwise overlaid the user interface of a legitimate website or application.

SUMMARY OF INVENTION

The present invention generally relates to a system and method for detecting a suspicious application overlay on a device, such as a smartphone or other mobile device. One embodiment of the present invention is directed to a method wherein a determination is made that a currently-displayed foreground application has replaced a previously-displayed foreground application. In response to determining that the foreground application has been replaced, a name or other identifier associated with the current foreground application may be obtained and a determination can then be made as to whether the current foreground application is a protected application. If the current foreground application is a protected application, a timestamp may be associated with the current foreground application and the name or other identifier associated with the current foreground application can be saved to a protected applications state. Additionally, a name or other identifier associated with the previous foreground application may be obtained and a determination can be made as to whether the previous foreground application is a protected application. In response to determining that the previous foreground application is a protected application, the replacement time in which the previous foreground application was replaced by the current foreground application may be determined.

In one aspect of the invention, the replacement time can be compared to a specified or predetermined threshold time. The threshold time may be based on the time it would take for a typical human user to replace the previous foreground application with the current foreground application. In particular, the threshold time can be set to a time that is less than the amount of time it would take for the typical human user to replace the previous foreground application with the current foreground application. In response to determining that the replacement time is below the threshold time, it may be determined or indicated that a suspicious overlay is present. In doing so, a user interface may be presented on the device that provides a first user interface element that upon activation, allows an application presenting the suspicious overlay to proceed, and a second user interface element that protects a user from entering information on the suspicious overlay. In response to determining that the replacement time is not below the threshold time, the name or other identifier associated with the current foreground application may be saved to a protected applications state.

Another embodiment of the present invention relates to a non-transitory machine-readable medium having instructions stored thereon, the instructions comprising computer executable instructions that when executed are configured for detecting a suspicious application overlay on a device. In one embodiment, the computer executable instructions cause one or more processors to undertake one or more steps of the method generally described above.

A further aspect of the present invention relates to an apparatus, such as a smartphone or other mobile device for example, that includes one or more processors and a non-transitory machine-readable medium having computer executable instructions stored thereon adapted for detecting a suspicious application overlay on the apparatus as generally described above.

BRIEF DESCRIPTION OF THE DRAWINGS

For a better understanding of the inventive subject matter, reference may be made to the accompanying drawings in which.

DETAILED DESCRIPTION

Figure 1:
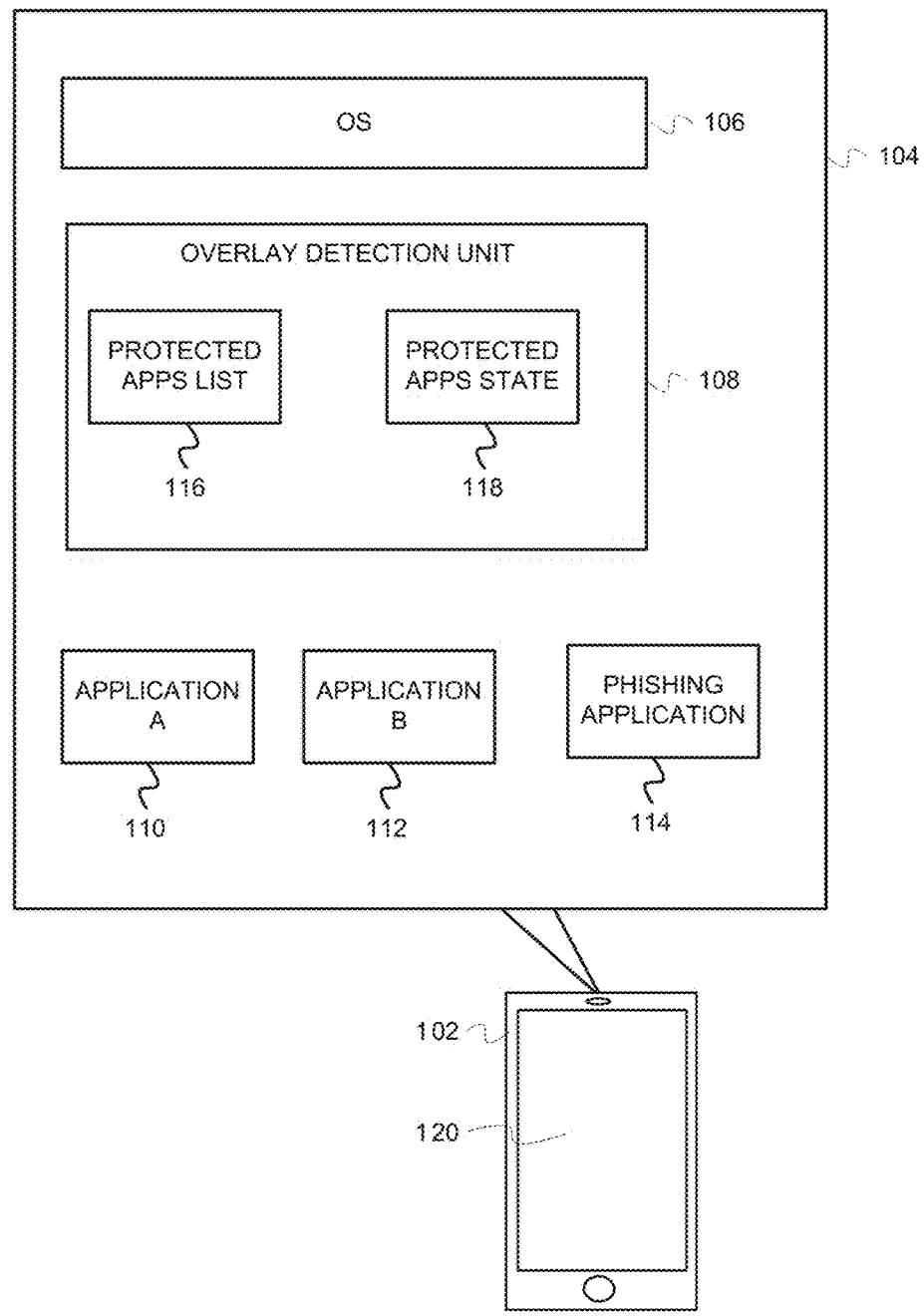
FIG. 1 is a block diagram of an operating environment of a device according to one embodiment of the present invention.

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Recent mobile threats have included the ability for malicious applications to create fake overlays above a user's legitimate applications, for example, finance applications, in order to obtain banking credentials, credit card numbers, financial information, login names and passwords, text or messaging communications, potentially risky personal data, heath data, biometric data, keyboard inputs, and other sensitive or confidential information.

An overlay detection unit can detect if a first foreground application has been replaced, within a threshold amount of time, by a second foreground application. If the replacement time is below a threshold amount of time, a suspicious overlay detection interface or alert message can be triggered to alert the user to a possible phishing attempt by the second foreground application.

FIG. 1 is a block diagram of an operating environment 100 for a system to detect suspicious overlays according to one embodiment of the invention. In one embodiment, operating environment 100 includes a device 102 having a display 120 and a software environment 104. In some aspects, device 102 can be a smartphone. However, the inventive subject matter is not limited to smartphones, and it will be appreciated that device 102 can be a tablet computer, e-reader, media player (e.g., MP3 player), gaming system, television, infotainment system, smart appliance, wearable device, laptop computer, desktop computer, or any other electronic device suitable for running software applications.

Software environment 104 comprises a set of software that operates on device 102, and includes operating system 106 and overlay detection unit 108. Operating system 106 controls execution of applications running on device 102 (e.g., application A 110, application B 112, phishing application 114). Further, operating system 106 manages the resources of device 102, and provides interfaces (e.g., graphical user interfaces or GUIs) between the applications running on device 102 and hardware components of device 102 (e.g., display 120). In some embodiments, operating system 106 is the Android® operating system. However, the embodiments of the present invention are not limited to any particular operating system, and in other embodiments, the operating system 106 can be the iOS® operating system, a version of the Microsoft® Windows® family of operating systems, a version of the Linux operating system or any other operating system.

Application A 110 can be any type of application running on device 102. In some aspects, application 110 can be an application that accesses sensitive information such as an application that accesses a bank account, a stock trading account, credit card information, or other financial application. Application A 110 can also be an application that accesses health information, email information, messaging information, or other sensitive or confidential information.

Application B 112 can be any type of application. In some aspects, application B 112 can be an application that does not necessarily access sensitive information. For example, application B 112 can be an application that provides weather information, provides a game, or other application.

Phishing application 114 can be a malicious application that provides a user interface that mimics a credential screen or input screen of a legitimate application (e.g., application A 110). Phishing application 114 can be malware that is inadvertently installed on a user's device 102. Phishing application 114 can obtain the user's credentials and transfer the credentials to a malicious party that can then use the credentials to obtain the user's sensitive information, or sell the credentials. Phishing application 114 may additionally or alternatively include concealed hyperlinks beneath legitimate clickable and seemingly innocuous content thereby further causing the user to perform actions of which they are unaware.

Overlay detection unit 108 can be an application running on device 102 that provides a security function for device 102. In particular, overlay detection unit 108 can be an application or portion of an application that uses the systems and methods described herein to detect that a phishing application 114 has overlaid a user interface of another application (e.g., application A 110 or B 112). Although described as an application, the functionality of overlay detection unit 108 may be integrated into operating system 106 or within another application.

In some aspects, overlay detection unit 108 can access and/or maintain a protected applications list 116. Protected applications list 116 is a list of applications that may be installed on device 102 that overlay detection unit 108 is to protect. The protected applications list can be supplied by the provider of the overlay detection unit 108. Alternatively, a user may be provided a means for creating and/or maintaining the protected applications list. For example, an editor or graphical user interface may be used to create and/or update which applications appear in protected applications list 116.

Overlay detection unit 108 can maintain a protected applications state 118 data structure. The protected applications state 118 can include fields that identify the protected application (e.g., an application name, package name, or other identifier) and maintain information about the protected application such as a timestamp associated with when the application was last placed into the foreground, activity change time limit(s) and current state of the application.

Thus, in the example illustrated in FIG. 1, assume that application A 110 is in the protected applications list 116, and that application B 112 is not. Using the methods described below, if phishing application 114 overlays application A 110, a suspicious overlay event may be detected. However, if phishing application 114 overlays application B 112 that is not in the protected applications list 116, a suspicious overlay event may not be detected. Further details on the operation of system 110 are provided below with respect to FIGS. 2-4.

Figure 2:
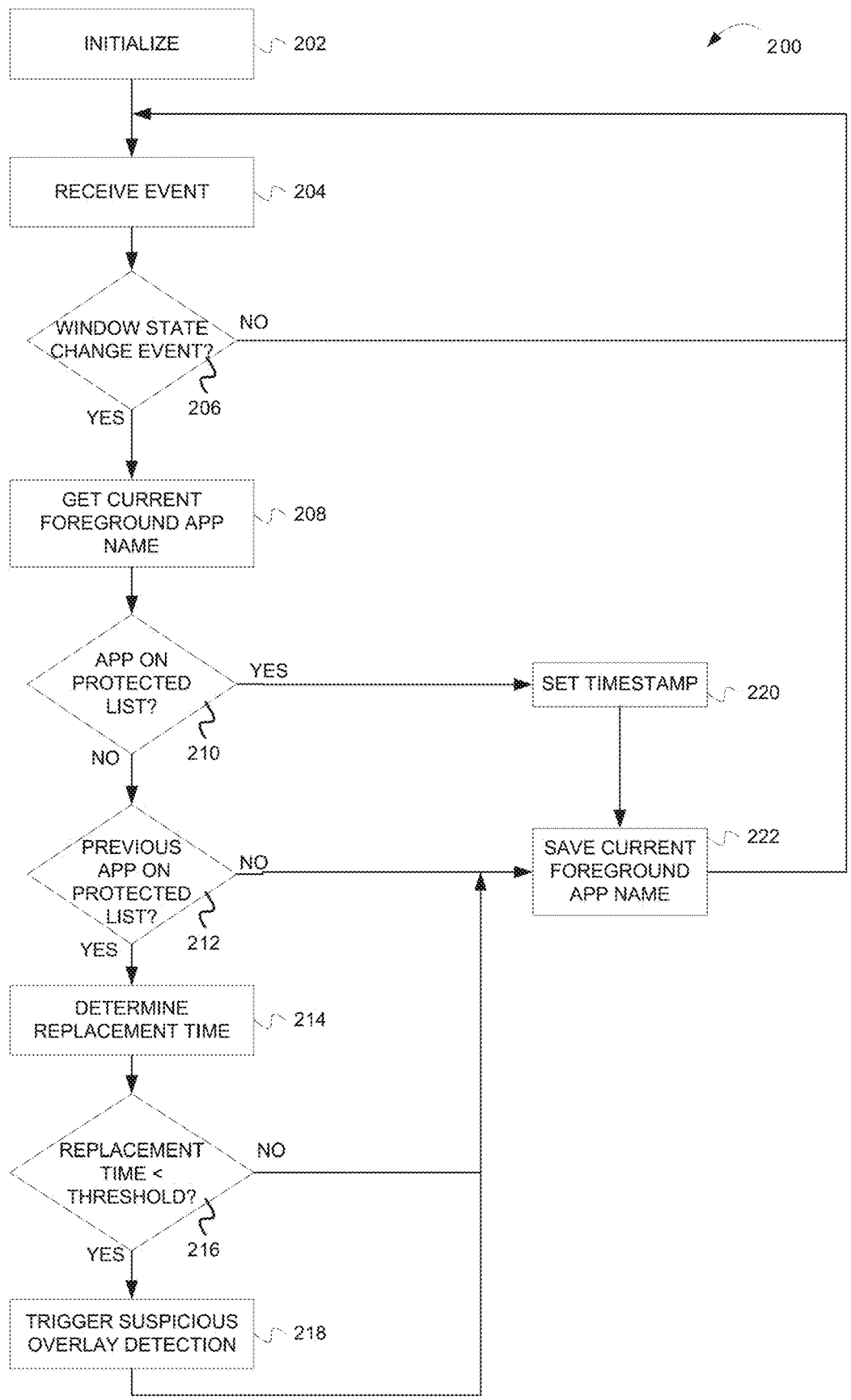
FIG. 2 is a flowchart describing a method for detecting suspicious application overlays according to one embodiment of the present invention.

FIG. 2 is a flowchart 200 describing a method for detecting a suspicious overlay on a device 102 according to embodiments of the present invention. The method may, in some aspects, constitute computer programs made up of computer-executable instructions. Describing the method by reference to a flowchart enables one skilled in the art to develop such programs including such instructions to carry out the method on suitable processors (the processor or processors of the computer executing the instructions from computer-readable media). The method illustrated in FIG. 2 is inclusive of acts that may be taken by an operating environment 100 executing an example embodiment of the invention.

At block 202, the method begins with initializing overlay detection unit 108. In some aspects, such initialization can include determining which system events will be monitored. For example, in embodiments running under the Android operating system, the "WindowChangeDetectingService" class extends an AccessibilityService class. The WindowChangeDetectingService can be used to determine which events and/or actions are observed in the Android operating system and it contains a callback method "onServiceConnected" that is called after the system has successfully bound to the service. The "onServiceConnected" method is used to set the events that will be monitored. For example, in some aspects, the event monitored is the "AccessibilityEvent.TYPE_WINDOW_STATE_CHANGED" event. Additionally, in order to maintain compatibility with certain versions of the Android operating system, the flag "AccessibilityServiceInfo.FLAG_INCLUDE_NOT_IMPORTANT_VIEWS" can be set if the Build.VERSION.SDK_INT is greater or equal to 16.

Additionally, the initialization may include specifying an operating system or application method that is called in response to events, for example, events related to changes in window status. In embodiments running under the Android operating system, this method can be the "onAccessibilityEvent" method.

Those of skill in the art having the benefit of the disclosure will appreciate that other operating systems may have methods and/or functions that provide equivalent functionality, and that such methods may be used to initialize overlay detection unit 108.

At block 204, an event is received. In embodiments running under the Android operating system, the "onAccessibilityEvent" method receives the event.

At decision block 206, the overlay detection unit 108 determines if the event was a window state change event. For example, in embodiments running under the Android operating system, the "onAccessibilityEvent" method can determine if the event type received is equal to AccessibilityEvent.TYPE_WINDOW_STATE_CHANGED.

If event indicates a window state change, then at block 208, the method can obtain or be provided with the name or other identifier of the application that had its window opened in the foreground (referred to as the "foreground application"). In some aspects, the method obtains the package name of the component and proceeds to block 210.

Otherwise, if the event is not a monitored event, then the method returns to block 204 to await reception of the next event. In some aspects, if the event is not for an Android activity (i.e., an application with a user interface present on the screen), then the method can also return to block 204. For example, if the event is for a component that is not an activity (e.g., a background service, a broadcast receiver, or a content provider), then the method returns to block 204.

Decision block 210 is reached if a monitored event is detected. At decision block 210, a check is made to determine if the foreground application is in the protected applications list 116. If the application is in the protected applications list, then flow proceeds to block 220. Otherwise, if the foreground application is not in the protected application list, flow proceeds to decision block 212.

Block 220 is reached if a window state change is detected for a foreground application that is in the protected applications list 116. At block 220, a timestamp is associated with the protected foreground application. In embodiments running under the Android operating system, the timestamp can be created with the call "System.currentTimeMillis" and can be put into a timestamp field of the protected application state 118 data structure, with the protected application package name as the key for the data structure. For example, in Java implementations a HashMap data structure can be used.

The method then proceeds to block 222, where the current foreground application name or other identifier for the application can be saved. In embodiments running under the Android operating system, the current foreground application package name or other identifier for the application can be saved into the protected applications state 118 data structure. From block 222, the method returns to block 204 to await the next event.

If the check at decision block 210 determines that the application is not on the protected applications list 116, then at decision block 212, the method checks to see if the previous foreground application was on the protected applications list 116. For example, the application name or other application identifier saved in the protected applications state 118 data structure can be checked against the protected applications list 116. If the previous foreground application is not a protected application (i.e., it is not in the protected application list 116), then the method proceeds to block 222 to save the current foreground application name. As noted above, the current foreground application package name or other identifier can be saved into the protected applications state 118. From block 222, the method returns to block 204 to await the next event.

If the check at decision block 212 determines that the previous application is a protected application (i.e., the application name is on the protected applications list 116), then the method proceeds to block 214.

At block 214, the system determines a foreground application replacement time. The foreground application replacement time is the amount of time that has elapsed between when the previous foreground application was replaced with the current foreground application. For example, the time that has been previously put into the timestamp field of the protected applications state 118 at block 220 can be subtracted from the current time. This result can provide the replacement time in which the protected application was replaced by a new foreground activity.

At decision block 216, a check is made to determine if the replacement time is lower than a predetermined or configurable threshold. In some embodiments, the threshold time can be stored in the protected applications state 118 data structure as an activity change time limit. The threshold time can be determined, for example, based on the time it would typically take for a human user to change foreground applications. Setting the threshold to a time that is less than the time it would typically take for a human user to change foreground applications can be used by the overlay detection unit to indicate that the foreground application may have been changed by a malicious application, and not by a human user of the device 102.

If the replacement time is less than the threshold time, then at block 218, a suspicious overlay detection is triggered, and the user can be alerted to the suspicious overlay. Examples of the alert are presented in FIGS. 3 and 4.

If the replacement time is not less than the threshold time, then the method proceeds to block 222 to save the current foreground application name. As noted above, the current foreground application package name can be saved into the protected applications state data structure. From block 222, the method returns to block 204 to await the next event.

Figure 3:
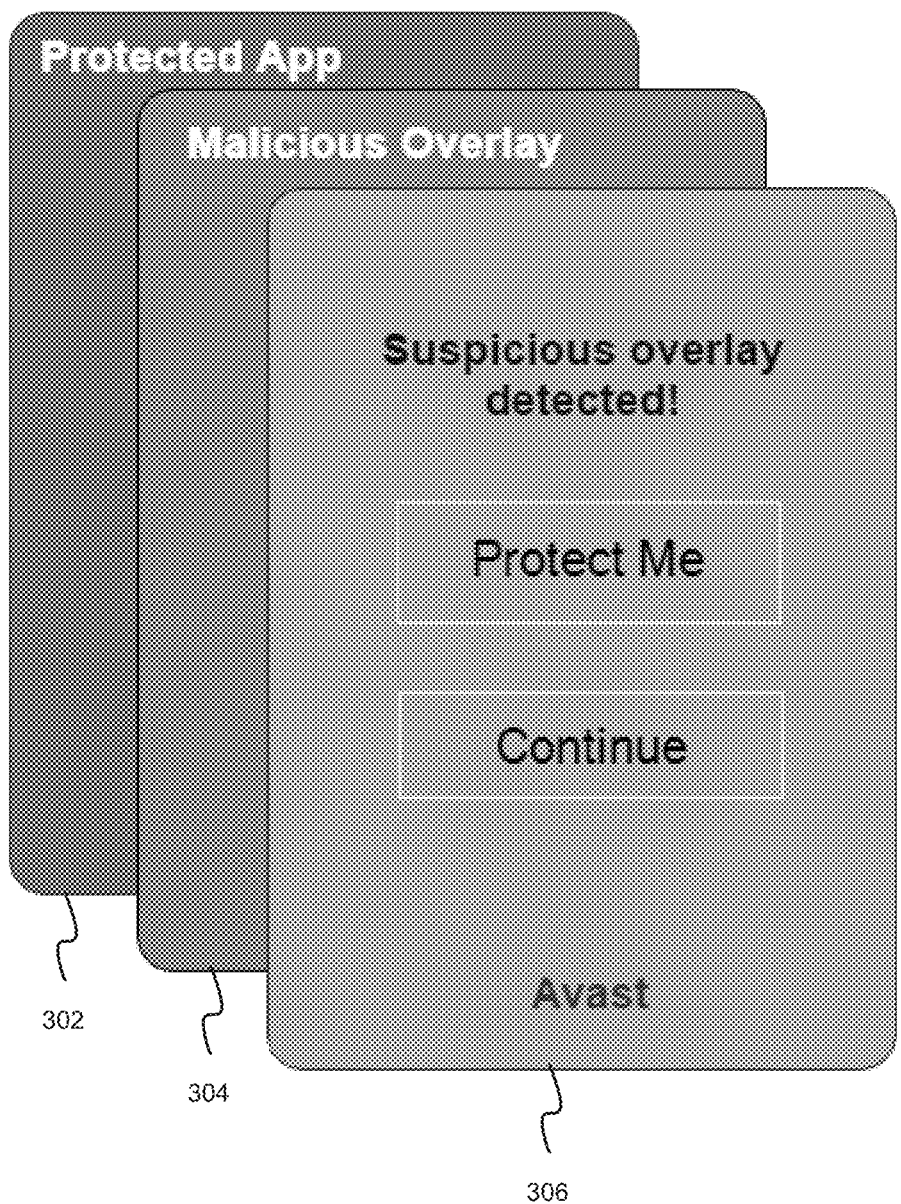
FIG. 3 is an illustration of example layers of user interfaces presented on a device according to one embodiment of the present invention.

FIG. 3 is an illustration of example layers of user interfaces presented on a device 102. In some aspects, the example user interfaces include a protected application user interface 302, a phishing application overlay interface 304, and a suspicious overlay detection interface 306.

Protected application user interface 302 can be a user interface that requests user credentials for an application that maintains sensitive information. For example, protected application user interface can be a user interface for a financial application appearing in the protected application list 116.

Phishing application overlay interface 304 can be a user interface surreptitiously provided by a phishing application that is designed to mimic a user interface that receives user credentials.

Suspicious overlay detection interface 306 can be a user interface that is provided in response to detection a suspicious application overlay. In some aspects, the suspicious overlay detection interface 306 can provide a button or other user interface element that allow the user to be protected from entering information on the phishing application overlay interface 304. For example, the user may be returned to the home screen, thereby bypassing entering information on the phishing application overlay interface 304. A second button or other user interface element may allow the user continue to provide the information on phishing application overlay interface 304 (e.g., allowing the user to override the determination the phishing application overlay interface 304 is malicious).

In FIG. 3, the interfaces 302, 304 and 306 are shown as being offset from one another in order to better illustrate the layering of interfaces. In actual operation, the interfaces 302, 304 and 306 would completely or at least substantially completely overlay one another.

Figure 4:
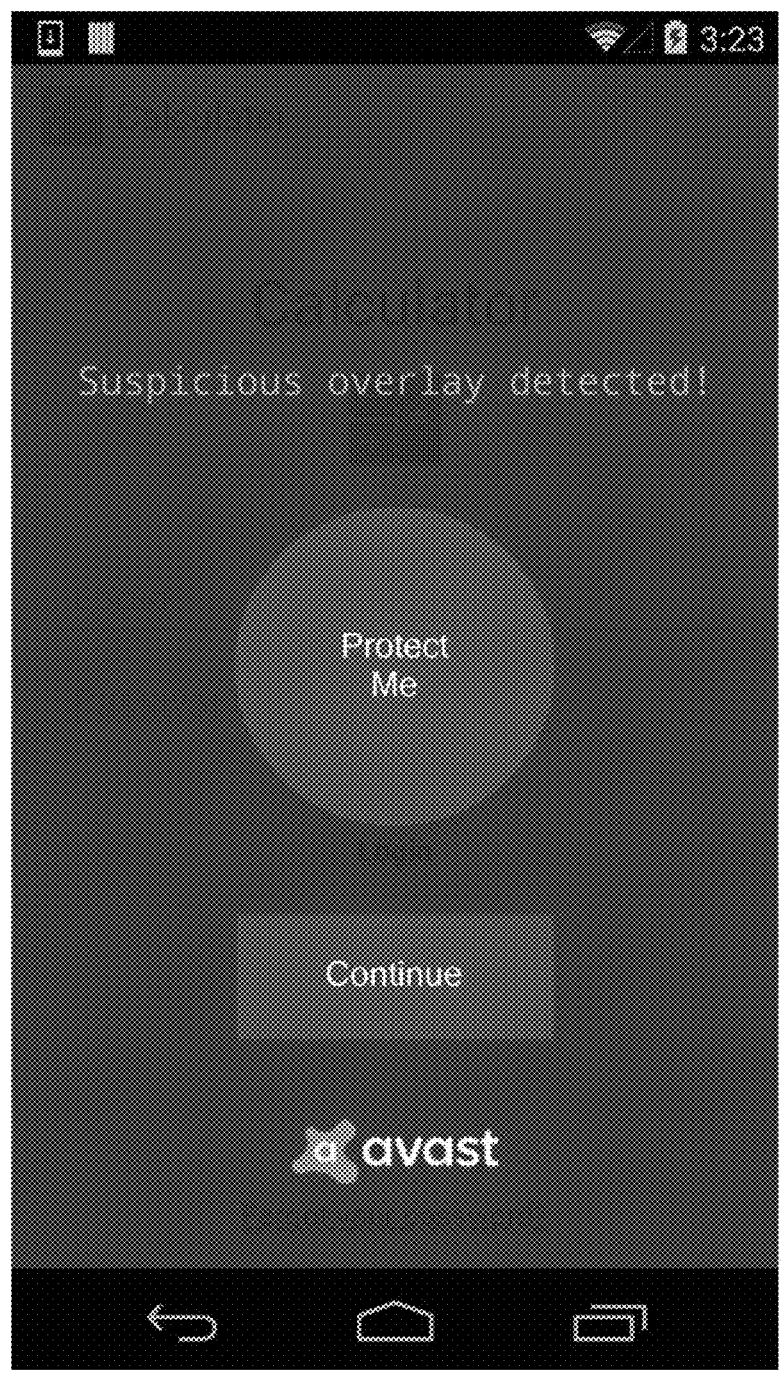
FIG. 4 is an illustration of an example screen interface according to one embodiment of the present invention.

FIG. 4 is an illustration of an example screen interface 400 as it may appear in a display 120 of a device 102.

Figure 5:
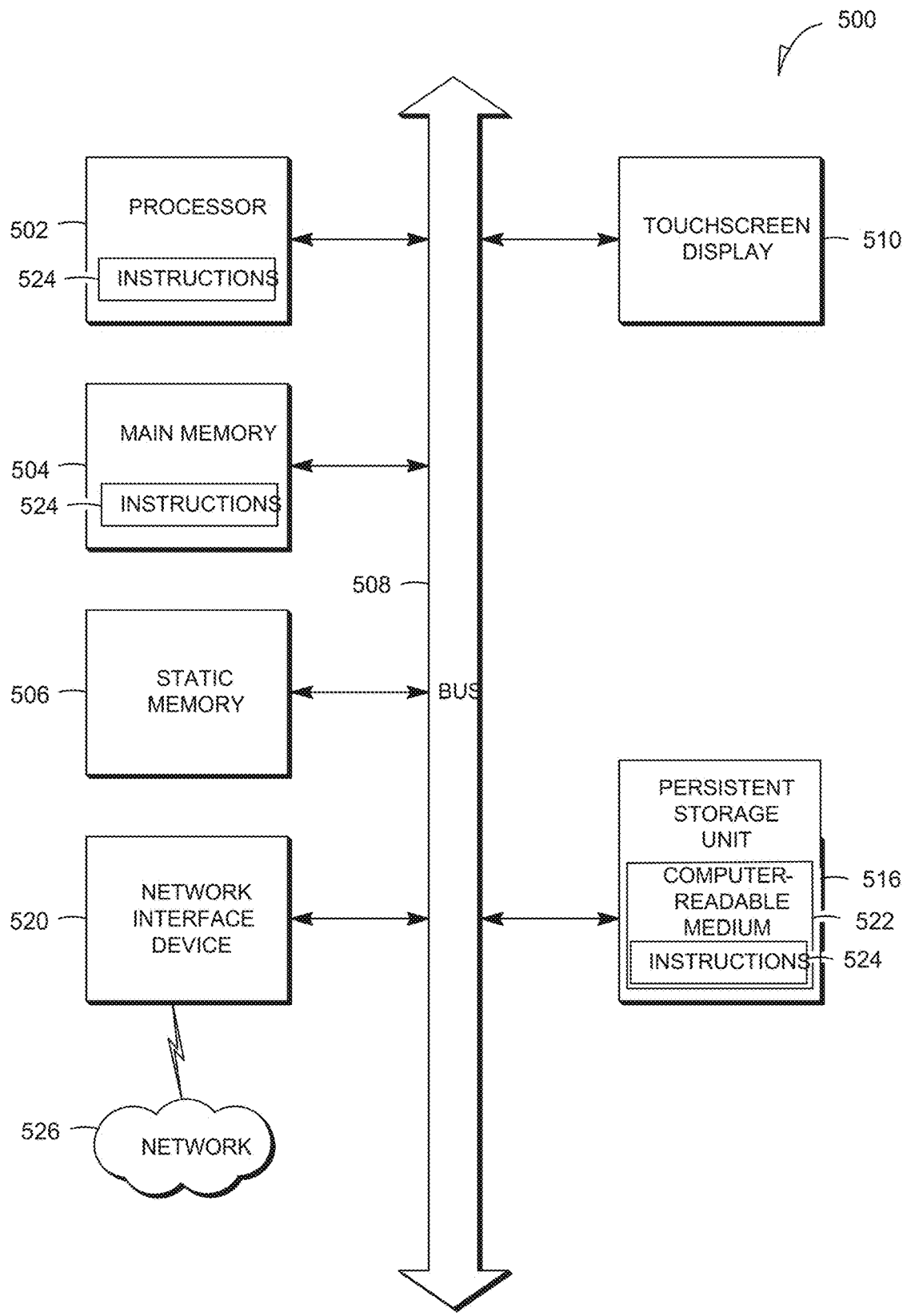
FIG. 5 is a block diagram of an example embodiment of a computer system upon which embodiments of the inventive subject matter can execute according to one embodiment of the present invention.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a touchscreen display unit 510. In example embodiments, the computer system 500 also includes a network interface device 520.

The persistent storage unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. A machine-readable storage medium does not include signals.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for detecting a suspicious overlay interface on a device, the method comprising:
    determining that a current foreground application has replaced a previous foreground application;
    in response to determining that the previous foreground application is a protected application:
    determining a replacement time in which the previous foreground application was replaced by the current foreground application; and
    in response to determining that the replacement time is below a threshold time, determining that a suspicious overlay is present; and
    presenting a user interface providing a first user interface element that upon activation, allows an application presenting the suspicious overlay to proceed, and a second user interface element that protects a user from entering information on the suspicious overlay.

2. The method of claim 1, wherein the device comprises a smartphone.

3. The method of claim 1, wherein the step of determining that the current foreground application has replaced the previous foreground application is in response to determining a window state change on the device.

4. The method of claim 1 further comprising determining the threshold time based on the time it would take for a human user to replace the previous foreground application with the current foreground application.

5. The method of claim 1 further comprising setting the threshold time to a time that is less than the time it would take for a human user to replace the previous foreground application with the current foreground application.

6. The method of claim 5 further comprising storing the threshold time.

7. The method of claim 1 further comprising:
    obtaining a name or other identifier associated with the current foreground application; and
    determining whether the current foreground application is a protected application.

8. The method of claim 7, wherein in response to determining that the current foreground application is a protected application:
    associating a timestamp with the current foreground application; and
    saving the name or other identifier associated with the current foreground application to a protected applications state.

9. The method of claim 1, wherein in response to determining that the replacement time is not below a threshold time:
    saving the name or other identifier associated with the current foreground application to a protected applications state.

10. A non-transitory machine-readable medium having instructions stored thereon, the instructions comprising computer executable instructions that when executed, cause one or more processors to:
    determine that a current foreground application has replaced a previous foreground application;
    in response to determining that the previous foreground application is a protected application:
    determine a replacement time in which the previous foreground application was replaced by the current foreground application; and
    in response to determining that the replacement time is below a threshold time, determine that a suspicious overlay is present; and
    present a user interface providing a first user interface element that upon activation, allows an application presenting the suspicious overlay to proceed, and a second user interface element that protects a user from entering information on the suspicious overlay.

11. The non-transitory machine-readable medium of claim 10, wherein the step of determining that the current foreground application has replaced the previous foreground application is in response to determining a window state change on the device.

12. The non-transitory machine-readable medium of claim 10, wherein the computer executable instructions further comprise computer executable instructions to:
    set the threshold time to a time that is less than the time it would take for a human user to replace the previous foreground application with the current foreground application.

13. The non-transitory machine-readable medium of claim 10, wherein the computer executable instructions further comprise computer executable instructions to:
    obtain a name or other identifier associated with the current foreground application; and
    determine whether the current foreground application is a protected application.

14. The non-transitory machine-readable medium of claim 13, wherein the computer executable instructions further comprise computer executable instructions to, in response to determining that the current foreground application is a protected application:
  associate a timestamp with the current foreground application; and
  save the name or other identifier associated with the current foreground application to a protected applications state.

15. The non-transitory machine-readable medium of claim 10, wherein the computer executable instructions further comprise computer executable instructions to, in response to determining that the replacement time is not below a threshold time:
  save the name or other identifier associated with the current foreground application to a protected applications state.

16. An apparatus comprising:
  one or more processors; and
  a non-transitory machine-readable medium having computer executable instructions stored thereon, that when executed, cause the one or more processors to:
  determine that a current foreground application has replaced a previous foreground application;
  in response to determining that the previous foreground application is a protected application:
  determine a replacement time in which the previous foreground application was replaced by the current foreground application; and
  in response to determining that the replacement time is below a threshold time, determine that a suspicious overlay is present; and
  present a user interface providing a first user interface element that upon activation, allows an application presenting the suspicious overlay to proceed, and a second user interface element that protects a user from entering information on the suspicious overlay.

17. The apparatus of claim 16, wherein the computer executable instructions further comprise computer executable instructions to:
  set the threshold time to a time that is less than the time it would take for a human user to replace the previous foreground application with the current foreground application.

18. The apparatus of claim 16, wherein the computer executable instructions further comprise computer executable instructions to:
  obtain a name or other identifier associated with the current foreground application; and determine whether the current foreground application is a protected application.

19. The apparatus of claim 18, wherein the computer executable instructions further comprise computer executable instructions to in response to determining that the current foreground application is a protected application:
  associate a timestamp with the current foreground application; and
  save the name or other identifier associated with the current foreground application to a protected applications state.

20. The apparatus of claim 16, wherein the computer executable instructions further comprise computer executable instructions to, in response to determining that the replacement time is not below a threshold time:
  save the name or other identifier associated with the current foreground application to a protected applications state.

\* \* \* \* \*